(12) United States Patent
Lee

(10) Patent No.: US 10,183,578 B2
(45) Date of Patent: Jan. 22, 2019

(54) VEHICLE CLUSTER GAUGE SYSTEM AND METHOD FOR CALIBRATING THE SAME

(71) Applicants: HYUNDAI MOTOR COMPANY, Seoul (KR); KIA MOTORS CORPORATION, Seoul (KR)

(72) Inventor: Kang Ho Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 15/218,734

(22) Filed: Jul. 25, 2016

(65) Prior Publication Data

US 2017/0101012 A1  Apr. 13, 2017

(30) Foreign Application Priority Data

Oct. 13, 2015 (KR) .................. 10-2015-0142882

(51) Int. Cl.
*G01D 18/00* (2006.01)
*B60K 35/00* (2006.01)
(Continued)

(52) U.S. Cl.
CPC .............. *B60K 35/00* (2013.01); *B60K 37/02* (2013.01); *G01D 13/04* (2013.01); *G01D 18/00* (2013.01);
(Continued)

(58) Field of Classification Search
CPC ....................................................... B60K 35/00
(Continued)

(56) References Cited

U.S. PATENT DOCUMENTS 5,665,897 A * 9/1997 Lippmann .............. G01D 18/00
318/490
6,771,038 B2 * 8/2004 Fyfe ........................ G01D 11/16
116/28.1
(Continued)

FOREIGN PATENT DOCUMENTS

JP           3385724 B2    3/2003
JP       2003-130694 A    5/2003
(Continued)

OTHER PUBLICATIONS

Korean Office Action issued in Application No. 10-2015-01428852 dated Sep. 12, 2016.
(Continued)

*Primary Examiner* — David S Luo
(74) *Attorney, Agent, or Firm* — McDermott Will & Emery LLP

(57) ABSTRACT

A method of calibrating and controlling a gauge, to which a stepper motor is applied in a cluster of hybrid electric vehicle (HEV), includes: receiving information corresponding to an operation state of an electric motor from a certain controller; and controlling a gauge angle indicated by a needle of the gauge to correspond to a target gauge angle indicated by the received information. The step of controlling includes: setting a dropping flag when the target gauge angle is lower than a previous gauge angle; and calibrating the target gauge angle to drop by a reference angle when the target gauge angle corresponds to an angle value that is different from a lowest point of the gauge while setting the dropping flag.

20 Claims, 4 Drawing Sheets

(51) Int. Cl.
　　　*G01D 13/04* 　　　(2006.01)
　　　*B60K 37/02* 　　　(2006.01)
(52) U.S. Cl.
　　　CPC .. *B60K 2350/352* (2013.01); *B60K 2350/408* (2013.01)
(58) Field of Classification Search
　　　USPC .................................................. 318/490, 34
　　　See application file for complete search history.

(56) References Cited

U.S. PATENT DOCUMENTS 7,816,883 B2 * 10/2010 Houser .................... H02P 8/08
　　　　　　　　　　　　　　　　　　　　　　　　　　　318/434
2002/0011537 A1　1/2002　Durrstein et al.

FOREIGN PATENT DOCUMENTS

| JP | 2004-347456 A | 12/2004 |
|---|---|---|
| JP | 2007-055544 A | 3/2007 |
| JP | 2008-008676 A | 1/2008 |
| JP | 2010-086426 A | 4/2010 |
| JP | 2014-142225 A | 8/2014 |
| JP | 2014-182110 A | 9/2014 |
| JP | 2015-055612 A | 3/2015 |
| KR | 10-0499729 B1 | 7/2005 |

OTHER PUBLICATIONS

Korean Office Action issued in Application No. 10-2015-0142882 dated Mar. 23, 2017.

* cited by examiner

-Prior Art-

-Prior Art-

-Prior Art-

-Prior Art-

-Prior Art-

-Prior Art-

-Prior Art-

-Prior Art-

VEHICLE CLUSTER GAUGE SYSTEM AND METHOD FOR CALIBRATING THE SAME

CROSS-REFERENCE TO RELATED APPLICATION

This application claims the benefit of priority to Korean Patent Application No. 10-2015-0142882, filed on Oct. 13, 2015, which is hereby incorporated by reference as if fully set forth herein.

TECHNICAL FIELD

The present disclosure relates to a gauge disposed in a vehicle cluster and a method of calibrating the same, and more particularly, to a dial-type gauge to which a stepper motor is applied and a method of calibrating the same.

BACKGROUND

Recently, a hybrid electric vehicle (HEV) has been drawing attention as an eco-friendly vehicle.

In general, the HEV refers to a vehicle that uses two power sources together, which usually correspond to an engine and an electric motor. The HEV not only has excellent fuel efficiency and power performance but also is advantageous in reducing exhaust gas when compared to a vehicle that only includes an internal combustion engine, and thus, has recently been actively developed. Among HEVs, a plug-in hybrid electric vehicle (PHEV) may be connected to a plug to charge a battery that drives an elector motor with external power.

An analog dial-type gauge (hereinafter referred to as an "eco-gauge" for convenience of description), which indicates whether the electric motor is being charged or is driving a wheel and a level thereof, is disposed in a cluster in the HEV. The eco-gauge acquires information about a position to be indicated by a needle from a hybrid controller. Here, the hybrid controller may refer to a controller that controls whether to switch between a driving mode in which only the electric motor is used and a driving mode in which the engine is used together with the motor in the HEV.

A configuration, an operation, and a problem of the eco-gauge will be described with reference to FIGS. 1 and 2.

FIGS. 1A to 1E are diagrams for description of a configuration and a problem of a dial-type gauge of a general HEV.

Referring to FIG. 1A, an eco-gauge 100 of the HEV may broadly include a needle 110 and an area in which the needle 110 moves. The area in which the needle 110 moves includes a charging area 130 indicating charging of a motor on a left side and a driving area 140 indicating driving of the motor on a right side based on a zero point 120. When the ignition is turned OFF (IG OFF), the needle 110 remains at a lowest point 150.

When the ignition is turned ON (READY/IDLE STOP), the needle 110 operates in a rising mode to indicate the zero point 120 as in FIG. 1B.

As driving starts, the needle 110 operates in the rising mode or a dropping mode according to driving conditions as in FIG. 1C.

Incidentally, when the vehicle stops again during driving (that is, enters a READY/IDLE STOP mode), the needle 110 needs to operate in the dropping mode and stop at the zero point 120. However, in practice, the needle 110 may not accurately stop at the zero point 120 due to an error as in FIG. 1D. A picture of an actual eco-gauge experiencing this phenomenon is shown in FIG. 1E.

When the needle 110 returns to the zero point 120 in the dropping mode, the needle 110 may not accurately stop at the zero point 120 due to a scheme in which the needle 110 moves. This phenomenon will be described with reference FIGS. 2A to 2C.

FIGS. 2A to 2C are diagrams for description of a configuration of a stepper motor applied to the dial-type gauge and hysteresis occurring in the stepper motor.

The stepper motor may be applied to an eco-gauge of a general HEV. Here, the stepper motor (or step motor or stepping motor) refers to a motor that moves in steps to rapidly find an accurate position and settle at the position rather than continuously rotating.

FIG. 2A illustrates a configuration of the stepper motor. The stepper motor may include a coil 210, a rotor magnet 220, a rotor gear 230 that rotates by electromagnetic force generated from the coil 210 around the rotor magnet 220, an output gear 250 connected to the needle 110, and an idle gear 240 that delivers a torque between the rotor gear 230 and the output gear 250. This configuration is illustrative, and the idle gear 240 may be omitted or more idle gears may be included according to configuration.

This type of gear structurally has hysteresis, and a tolerance is usually designed in consideration of hysteresis since the gauge vibrates in response to a minute change in input when this tolerance design is not applied.

More specifically, as illustrated in FIG. 2B, a position at which the motor stops when the motor rotates in a positive direction is different from a position at which the motor stops when the motor rotates in a negative direction. Hysteresis of the stepper motor refers to a difference in stopped position at this time.

In general, as illustrated in FIG. 2C, the difference in stopped position corresponds to one step of the stepper motor, that is, one sawtooth 241 of the gear.

Such an error due to hysteresis of the stepper motor occurs at a middle position (that is, zero point) of the gauge. Thus, a problem due to an indication error does not occur in a gauge such as a velocity gauge or a temperature gauge in which a lowest point corresponds to a zero point. However, referring to a gauge such as the eco-gauge in which a zero point is in the middle, a needle cannot accurately indicate the zero point in the middle. Thus, consumers have been filing complaints about indicating the zero point, which is the most sensitive issue. In this way, a problem of quality has been occurring.

SUMMARY

Accordingly, the present disclosure is directed to a vehicle capable of more efficiently ensuring normal operation of a battery sensor, and a method of controlling the same that substantially obviate one or more problems due to limitations and disadvantages of the related art.

In particular, an object of the present disclosure is to provide a vehicle capable of ensuring normal operation of an idle stop and go (ISG) function by promptly resetting a battery sensor, and a method of controlling the same.

Technical problems to be solved by the present disclosure are not limited to the above-mentioned technical problems, and other technical problems not mentioned herein may be clearly understood by those skilled in the art from description below.

According to an exemplary embodiment in the present disclosure, a method of calibrating and controlling a gauge, to which a stepper motor is applied in a cluster of a hybrid electric vehicle (HEV), includes: receiving information corresponding to an operation state of an electric motor from a controller; and controlling a gauge angle indicated by a needle of the gauge to correspond to a target gauge angle indicated by the received information. The controlling includes: setting a dropping flag when the target gauge angle is lower than a previous gauge angle; and calibrating the target gauge angle to drop by a reference angle when the target gauge angle corresponds to an angle value that is different from a lowest point of the gauge while the dropping flag is set.

According to another exemplary embodiment in the present disclosure, an HEV includes a first controller for determining and controlling a driving mode using at least one of an electric motor and an engine, and a second controller for receiving information corresponding to an operation state of the electric motor from the first controller, and controlling a gauge to which a stepper motor is applied such that a gauge angle indicated by a needle of the gauge corresponds to a target gauge angle indicated by the received information. Here, the second controller sets a dropping flag when the target gauge angle is lower than a previous gauge angle, and calibrates the target gauge angle to drop by a reference angle when the target gauge angle corresponds to an angle value that is different from a lowest point of the gauge while setting the dropping flag.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Figure 1A:
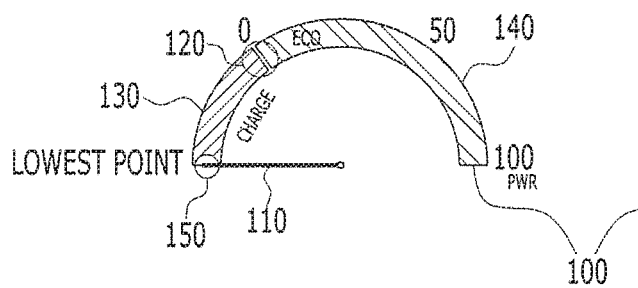
FIGS. 1A to 1E are diagrams for description of a configuration and a problem of a dial-type gauge of a general HEV.
Figure 1B:
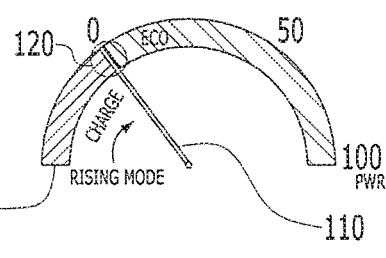
Figure 1C:
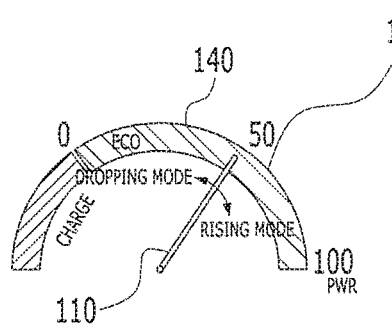

Reference will now be made in detail to embodiments disclosed in the specification with reference to accompanying drawings. The same reference numerals are applied to the same or similar components and repeated description thereof is omitted. The suffixes "module" and "unit" of elements herein are used for convenience of description and thus can be used interchangeably and do not have any distinguishable meanings or functions.

In addition, when a known technology related to description of the embodiments disclosed in the specification is determined to obscure the subject matter of the embodiments disclosed in the specification, a detailed description thereof is omitted. Further, the accompanying drawings merely aid in understanding of the embodiments disclosed in the specification, and does not restrict a technical spirit disclosed in the specification. Furthermore, it should be understood that the invention includes all modifications, equivalents, and substitutes within the spirit and the scope of the invention.

When an eco-gauge to which a stepper motor is applied is controlled in a hybrid electric vehicle (HEV), and when a gauge needle needs to indicate a certain angle other than a lowest point of the gauge at the time of dropping, a target gauge angle is dropped by an error due to hysteresis according to the present disclosure.

Here, the error due to hysteresis may correspond to an angle which corresponds to one step of the stepper motor. In addition, the target gauge angle may refer to a gauge angle that a needle of the eco-gauge needs indicate in response to gauge information received from a hybrid controller according to operation state of an electric motor.

Figure 1D:
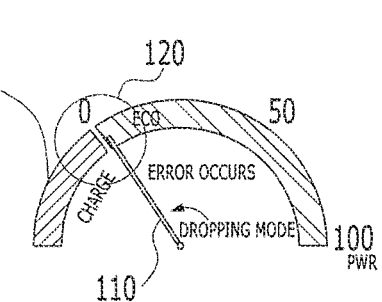
Figure 1E:
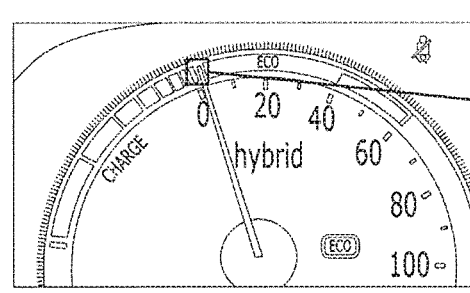
Figure 1E:
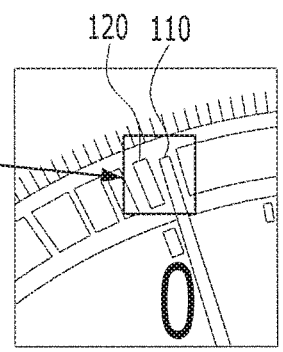
Figure 2A:
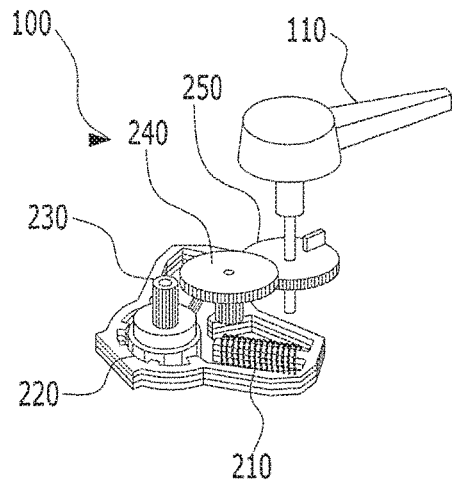
FIGS. 2A to 2C are diagrams for description of a configuration of a stepper motor applied to a dial-type gauge and hysteresis occurring in the stepper motor.
Figure 2B:
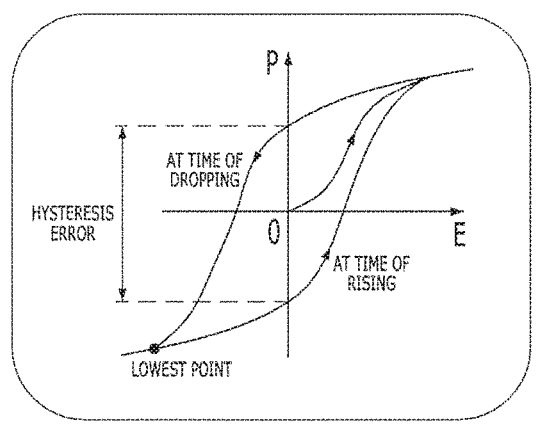
Figure 2C:
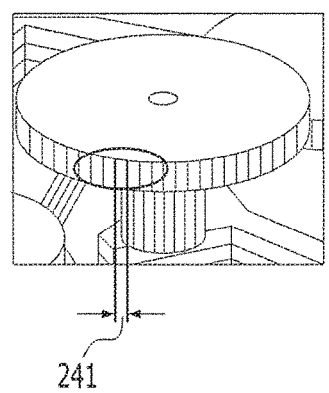

Further, it is possible to set or cancel a dropping a flag indicating whether the needle drops by comparing a previous gauge angle of the needle with a current target gauge angle when whether the needle drops is determined. Therefore, when the target gauge angle corresponds to a certain angle (that is, an angle corresponding to a zero point) at the time of dropping, corresponds to a case in which the gauge information received from the hybrid controller indicates the angle corresponding to the zero point while the dropping flag is set. In this case, when calibration according to the present disclosure is not performed, the needle indicates a point separated from the zero point by the error due to hysteresis (that is, one step) as in the general eco-gauge illustrated in FIGS. 1D and 1E. However, when the target gauge angle is controlled to be dropped by one step, the needle may accurately indicate the zero point.

The above-described gauge calibration method will be described using a flowchart as in FIG. 3 from a viewpoint of a controller that controls the eco-gauge.

Figure 3:
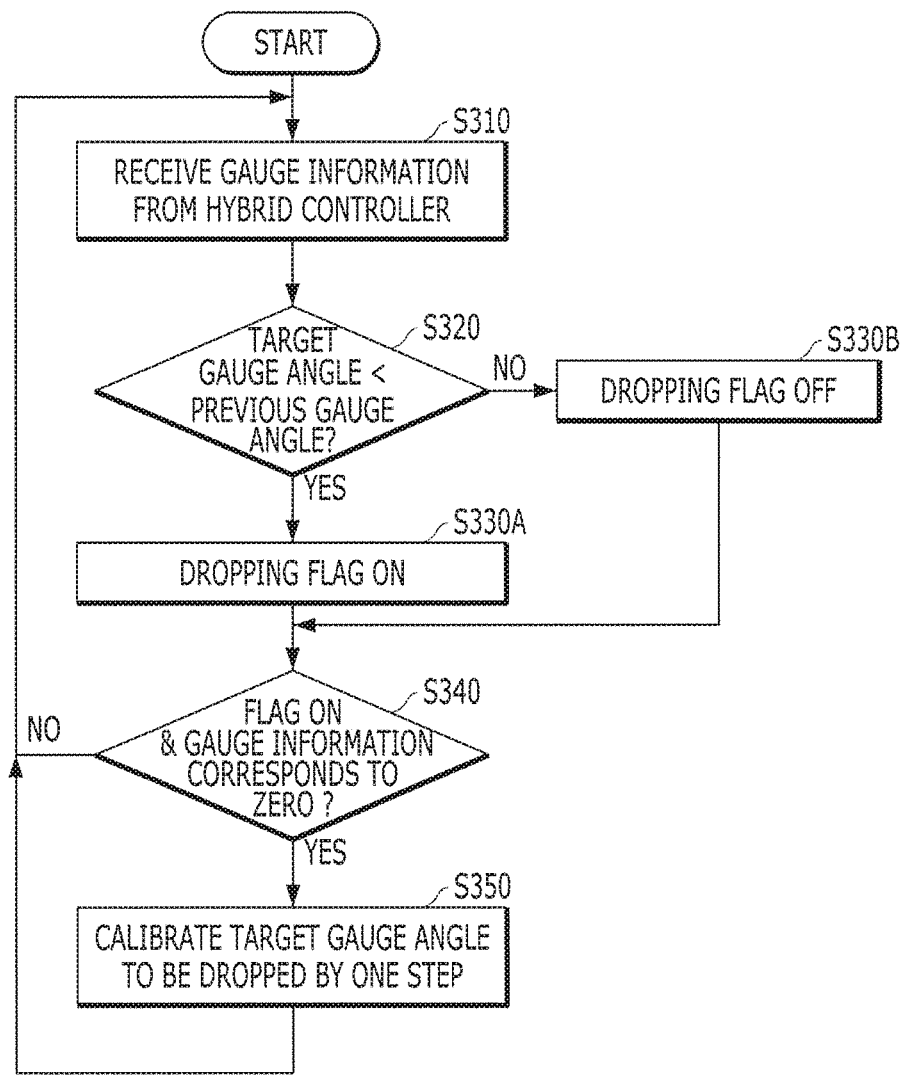
FIG. 3 is a flowchart illustrating an example of a process of calibrating an eco-gauge in an HEV according to an embodiment in the present disclosure.

FIG. 3 illustrates an example of a process of calibrating the eco-gauge in the HEV according to an embodiment in the present disclosure.

In FIG. 3, the controller that controls the eco-gauge is presumed to be a cluster controller, which is illustrative. It is clear to those skilled in the art that another controller such as a separate controller for controlling the eco-gauge other than the cluster controller may control the eco-gauge.

Referring to FIG. 3, first, gauge information is acquired from a hybrid controller in S310. In this instance, the gauge information may be delivered to the cluster controller including the eco-gauge through vehicle communication such as controller area network (CAN)/local interconnect network (LIN)/Ethernet communication from the hybrid controller. In addition, the gauge information may be acquired in real time or at predetermined intervals. Further, although not illustrated in FIG. 3, it is presumed that the needle of the eco-gauge indicates a target gauge angle indicated by the gauge information unless otherwise mentioned.

The cluster controller compares a current target gauge angle with a previous gauge angle in S320 to set a dropping flag in S330A when the target gauge angle is lower than the previous gauge angle and to cancel the dropping flag in S330B, otherwise.

When the target gauge angle indicated by the gauge information corresponds to a zero point while the dropping flag is set in S340, the cluster controller may calibrate the target gauge angle to be dropped by one step in S350 such that the needle actually indicates the zero point.

Next, a description will be given of a vehicle system configuration to which the above-described embodiment in the present disclosure is applicable with reference to FIG. 4.

Figure 4:
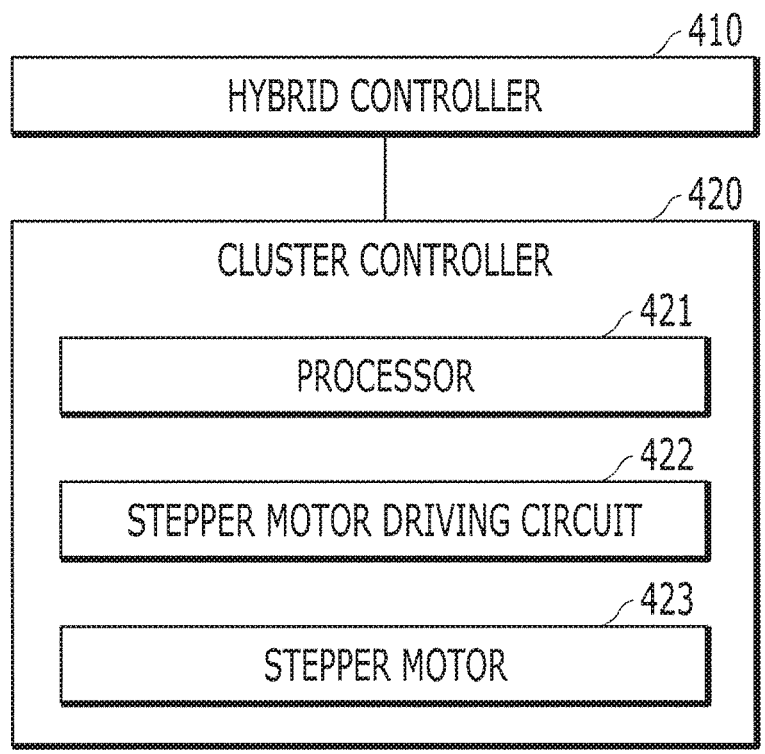
FIG. 4 is a block diagram illustrating an example of a system configuration of an HEV according to an embodiment in the present disclosure.

FIG. 4 illustrates an example of a system configuration of the HEV according to an embodiment in the present disclosure.

Referring to FIG. 4, the HEV according to the present disclosure may include a hybrid controller 410 for determining and controlling a driving mode using at least one of an electric motor and an engine, and a cluster controller 420 for controlling the eco-gauge by receiving gauge information according to operation state of the electric motor from the hybrid controller 410. The cluster controller 420 may include a processor 421, a stepper motor driving circuit 422, and a stepper motor 423. Here, the processor 421 performs operation and control necessary for overall operation of the cluster including the eco-gauge, and the stepper motor 423 performs a function of moving the needle of the eco-gauge. In addition, the stepper motor driving circuit 422 drives the stepper motor 423 according to a control instruction of the processor 421 such that the needle may indicate a target gauge angle indicated by the gauge information.

Only components participating in implementation of the present disclosure are illustrated in FIG. 4. Thus, it is clear to those skilled in the art that an actual vehicle may include more components.

According to at least one embodiment in the present disclosure, there are effects as below.

When a battery sensor cannot normally operate, the battery sensor may be more efficiently restored through resetting.

In particular, suspension of an idle stop and go (ISG) function due to abnormal operation of the battery sensor may be prevented.

Effects that may be obtained from the present disclosure are not limited to the above-mentioned effects, and other effects not mentioned herein may be clearly understood by those skilled in the art from the above description.

The above-described invention may be implemented as computer-readable code in a medium in which a program is recorded. A non-transitory computer-readable medium includes all types of recording devices in which data readable by a computer system is stored. Examples of the computer-readable medium include a hard disk drive (HDD), a solid state disk (SSD), a silicon disk drive (SDD), a read only memory (ROM), a random access memory (RAM), a CD-ROM, a magnetic tape, a floppy disk, an optical data storage device, etc. In addition, the computer-readable medium may also be implemented in the form of a carrier wave (for example, transmission over the Internet).

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein.

What is claimed is:

1. A method of calibrating and controlling a gauge to which a stepper motor is applied in a cluster of hybrid electric vehicle (HEV), the method comprising:
   receiving, by a controller information corresponding to an operation state of an electric motor; and
   controlling, by the controller, a gauge angle, which is indicated by a needle of the gauge, to correspond to a target gauge angle that is indicated by the received information,
   wherein the controlling comprises:
   setting a dropping flag when the target gauge angle is lower than a previous gauge angle; and
   calibrating the target gauge angle to drop by a reference angle when the target gauge angle has an angle value which is different from a lowest point value of the gauge while setting the dropping flag.

2. The method according to claim 1, wherein the gauge comprises:
   a first gauge area starting from the lowest point to indicate that the electric motor is charged; and
   a second gauge area indicating that the electric motor drives a wheel.

3. The method according to claim 2, wherein the angle value corresponds to a boundary point between the first gauge area and the second gauge area.

4. The method according to claim 1, wherein the reference angle corresponds to one step of the stepper motor.

5. The method according to claim 1, wherein the controlling further comprises: cancelling the setting of the dropping flag when the target gauge angle is higher than or equal to the previous gauge angle.

6. The method according to claim 1, wherein the controller is configured to determine and control a driving mode using at least one of the electric motor and an engine.

7. The method according to claim 1, wherein the controller sets the target gauge angle indicated by the received information to correspond to the angle value when a mode is switched to an idle stop mode during driving of the HEV when an ignition of the HEV is turned ON.

8. A computer-readable recording medium recording a program for executing the method according to claim 1.

9. A hybrid electric vehicle (HEV) comprising:
   a first controller configured to determine and control a driving mode using at least one of an electric motor and an engine; and
   a second controller configured to receive information corresponding to an operation state of the electric motor from the first controller and to control a gauge to which a stepper motor is applied, such that a gauge angle, which is indicated by a needle of the gauge, corresponds to a target gauge angle which is indicated by the received information,
   wherein the second controller sets a dropping flag when the target gauge angle s lower than a previous gauge angle and calibrates the target gauge angle to drop by a reference angle when the target gauge angle corresponds to an angle value which is different from a lowest point value of the gauge while setting the dropping flag.

10. The HEV according to claim 9, wherein the gauge comprises:
    a first gauge area starting from the lowest point to indicate that the electric motor is charged; and
    a second gauge area indicating that the electric motor drives a wheel.

11. The HEV according to claim 10, wherein the angle value corresponds to a boundary point between the first gauge area and the second gauge area.

12. The HEV according to claim 9, wherein the reference angle corresponds to one step of the stepper motor.

13. The HEV according to claim 9, wherein the second controller cancels the setting of the dropping flag when the target gauge angle is higher than or equal to the previous gauge angle.

14. The HEV according to claim 9, wherein the second controller comprises a cluster controller.

15. A cluster controller of a hybrid electric vehicle (HEV), the cluster controller comprising:
- a processor;
- a stepper motor for moving a needle of a gauge in a plurality of divided steps; and
- a stepper motor driving circuit for controlling rotation of the stepper motor according to a control instruction of the processor,
- wherein the processor is configured to:
- receive information corresponding to an operation state of an electric motor from a controller;
- control the stepper motor driving circuit such that a gauge angle indicated by the needle corresponds to a target gauge angle indicated by the received information;
- set a dropping flag when the target gauge angle is lower than a previous gauge angle; and
- calibrate the target gauge angle to be dropped by a reference angle when the target gauge angle corresponds to an angle value which is different from a lowest point of the gauge while setting the dropping flag.

16. The cluster controller according to claim 15, wherein the gauge comprises:
- a first gauge area starting from the lowest point to indicate that the electric motor is charged; and
- a second gauge area indicating that the electric motor drives a wheel.

17. The cluster controller according to claim 16, wherein the angle value corresponds to a boundary point between the first gauge area and the second gauge area.

18. The cluster controller according to claim 15, wherein the reference angle corresponds to one step of the stepper motor.

19. The cluster contra according to claim 15, wherein the processor cancels the setting of the dropping flag when the target gauge angle is higher than or equal to the previous gauge angle.

20. The cluster controller according to claim 15, wherein the controller is configured to determine and control a driving mode using at least one of the electric motor and an engine.

* * * * *